Patented Nov. 17, 1953

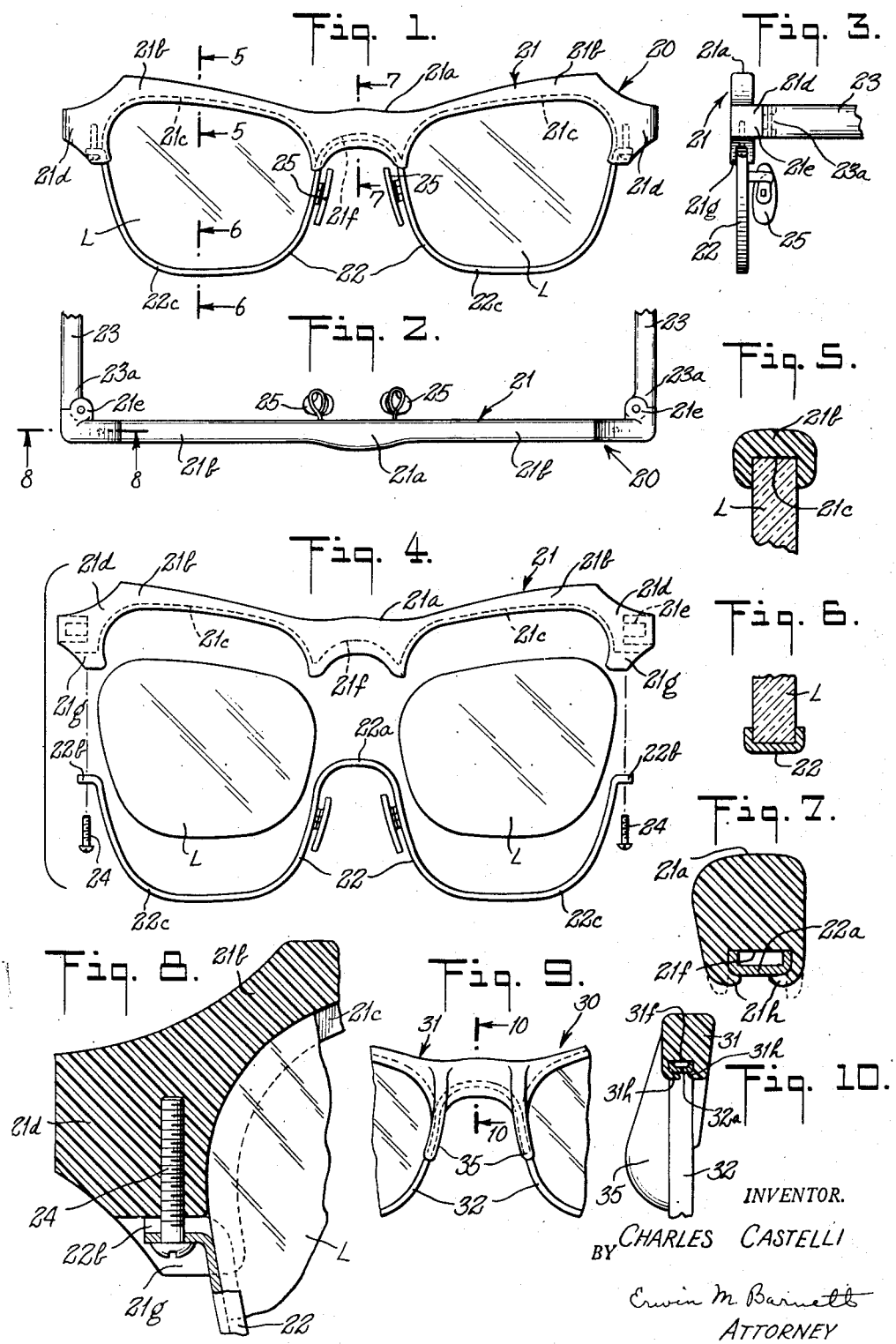

2,659,269

UNITED STATES PATENT OFFICE 2,659,269

COMBINATION PLASTIC AND METAL EYE-GLASS FRAME CONSTRUCTION

Charles Castelli, Union City, N. J., assignor, by mesne assignments, to Columbia Protektosite Co. Inc., Carlstadt, N. J., a corporation of Delaware Application November 15, 1950, Serial No. 195,753

3 Claims. (Cl. 88—47)

This invention relates to the manufacture of eyeglass frames, and more particularly is directed to an improved combination eyeglass frame construction formed of plastic material and metal, the latter being partly embedded and partly exposed to provide eyeglass frames with lens carrier portions of novel pleasing appearance.

Among objects of the invention is to generally improve constructions of the character described which shall comprise few and simple parts that are readily assembled to form rugged yet neat and attractive appearing combination plastic and exposed metal portions, which improved construction shall provide ready means for securing, interchanging and replacing lens, which shall be capable of withstanding rough usage, which improved combination construction shall be formed of plastic molded material with metal portions partly embedded and partly exposed in the lens carrier portions thereof adapted to form ornamental structures of appealing fashionable effect, which shall be relatively cheap to manufacture in quantity production and which shall be practical and efficient to a high degree in use.

Other objects of the invention will in part be obvious and in part hereinafter pointed out.

The invention accordingly consists of features of constructions, combination of elements and arrangement of parts which will be exemplified in the construction hereinafter disclosed, the scope of the application of which will be indicated in the claims following.

In the accompanying drawing in which one embodiment of the invention is shown,

Fig. 1 is a front elevational view of an improved eyeglass having a combination frame formed of plastic material and metal, the latter being partly embedded and partly exposed and constructed to embody the invention.

Figs. 2 and 3 are top and side elevational views, respectively, of the eyeglass construction shown in Fig. 1, end portions of the temple bars thereof being shown broken off.

Fig. 4 is an exploded front elevational view of the eyeglass construction shown in Fig. 1 with the parts arranged in an aligned position ready for assembly.

Figs. 5, 6 and 7 are enlarged fragmentary cross-sectional views showing details of the construction taken on lines 5—5, 6—6 and 7—7 in Fig. 1, respectively. In Fig. 7 are shown details of embedding the channel sectioned metal portion of the frame into the plastic nose bridge portion.

Fig. 8 is an enlarged fragmentary cross-sectional view of a frame end portion taken on lines 8—8 in Fig. 2 showing the anchorage of a metal end.

Fig. 9 is a fragmentary view of a modified form of the improved eyeglass construction embodying the invention showing nose pads molded as extension of the plastic frame portion, and Fig. 10 is an enlarged fragmentary cross-sectional view taken on line 10—10 in Fig. 9 showing in detail the embedding of the metallic portion in the plastic wall of the nose bridge.

Referring in detail to the drawing, 20 denotes an eyeglass construction having a combination frame formed with a brow bar 21 formed of suitable molded plastic material such as polystyrene, nylon or the like having partly embedded and retained in nose bridge region 21a thereof a midbight portion 22a of a metallic strip lens carrier 22, constructed to embody the invention.

When brow bar 21 is manufactured of polystyrene by injection molding in quantity production, said brow bar 21 may be shaped to conform to a predetermined contour of a wide range of styles as fashion requires and has integrally extending in opposite directions from said nose bridge region 21a, symmetrically disposed lens holders 21b. As shown in Figs. 1 and 4, said lens holders 21b may extend slightly upwardly and outwardly with respect to said nose bridge 21a, and each of said lens holders 21b may have a recessed edge groove 21c extending therealong with portion of said lens holders 21 inwardly of the ends thereof and adjacent the nose bridge region 21a curved so that grooves 21c conform for having neatly fitted therein the normally upper edges of the lens L as is clear from Figs. 1, 4 and 5.

Each of the opposite free ends 21d of lens holder 21b may terminate in an integrally molded hinge fitting portion 21e which as is clear from Figs. 1 and 3 cooperate with an end 23a of a temple bar 23 to form a swingable connection in the well understood manner.

As seen from Figs. 1, 4 and 7, nose bridge region 21a may also be provided with an edge groove 21f disposed to register in alignment with and form a continuation of said lens holder grooves 21c, the latter each terminating in slotted ends 21g in which the opposite end 22b of strip lens carrier 22 are anchored as shown in Figs. 1, 2, 3 and 8 and hereinafter more fully described.

Lens carrier 22 may be made of any suitable strip metal such as steel, brass, nickel or other suitable alloy to form a relatively stiff shape retaining structure yet sufficiently resilient to conform to minor irregularity or slight differences in sizes or shapes. Strip lens carrier 22 as shown in Figs. 6 and 7 may be of channel cross-section to provide a cradle for embracing sides and bottom edges of lens L, said strip carrier 22 being bent with the channelling thereof positioned and disposed for conforming to curve ended grooves 21c whereby the lens L are embraced in clamped position in eyeglass 20 assembly as is clear from Figs. 1, 3, 5, and 6. Said strip carrier 22 is thus seen to include when bent as above described loop portions 22c spaced apart by said mid-bight portion 22a with said terminating ends 22b pierced to provide passage of suitable fastening means, such as screws 24 for anchoring said lens carrier 22 in slotted ends 21g to said brow bar free ends 21d as shown in Fig. 8.

One feature of the invention is to provide an improved securing attachment of the lens carrier mid-bight portion 22a, that is, an embedding in the brow bar nose bridge region 21a. To this end edge groove 21f in said nose bridge region 21a may be made sufficiently deep to allow rim edges 21h of said grooves 21f to extend therebeyond so that when mid-bight portion 22a is seated in said groove 21f, said rim edges 21h may be, while still in a plastic state, curled over from the dotted to the full line positions shown in Fig. 7. Said improved embedding attachment as thus formed partially embraces the strip lens carrier portion 22a yet leaves the nose contacting surface of the assembled eyeglass 20 in a finished bearing state.

In Figs. 1, 2 and 3 eyeglass 20 is shown with a pair of nose pads 25 mounted along said mid-bight portion 22a in any conventional manner.

If desired a modified form of the invention of eyeglass assembly as denoted in Fig. 9 as eyeglass frame 30 may be made and assembled like eyeglass 20 above described except that nose pads 35 may be integrally molded as part of brow bar 31. Said pads 35 are thus extended as spaced fins down along mid-bight portion 32a of strip lens carrier 32, and said mid-bight portion 32a embedded in groove 31f for firm attachment by infolded edge rims 31h of said grooves 31f in the same manner as described above for the eyeglass frame assembly 20 and as shown in Fig. 10.

The practical utility of the invention will now be apparent. After the brow bars 21 or 31 have been molded to provide a structure as shown in Figs. 4 or 9, respectively, and strip lens carriers 22 or 32 have been bent from channel section material to conform to the desired shape required by lenses L, the parts may be arranged in registered alignment as shown in Fig. 4 and said strip lens carriers 22 or 32 assembled to brow bars 21 or 31 so that the lenses L are clamped therebetween. The rim edges 21h or 31h of grooves 21f or 31f may be bent inwardly to clamp the mid-bight portions 22a or 32a of the strip lens carrier 22 or 32, respectively, thereby clamping and embedding the said bight portions 22a or 32a permanently in position. The inwardly bending of said rim edge portions 22a or 32a are produced while said rim edges 21h or 31h are in a plastic state and held firmly in position until cooled and set as is clear from Figs. 1, 7, 9 and 10. Thereafter screws 24 may be inserted into pierced ends 22b and threaded into the brow bar end 21b as shown in Fig. 8 thereby firmly retaining the lenses L in the frames 20 or 30 as shown in Figs. 1 and 9. The temple bars 23 may then be assembled in proper swinging position by pivoting temple bar end 23a to the hinge fitting portion 21e as shown in Figs. 1 to 3. When assembled as above described there are provided improved eyeglass constructions having a composite frame of plastic molded material and metal, part of the metal being embedded into the plastic molded material so that the lenses L may be replaced or changed by simply removing the screws 24 and slipping the lenses L out or replacing the same with other lenses L, the lens holder 22c being sufficiently resilient to permit said bending without permanent distorting from said desired shape.

With the grooved brow bars 21 or 31 and the channeled strip lens carrier 22 or 32 as above described slight irregularities or differences in size of edge contour of lenses L will not interfere with making practical rigid neat appearing assembled structures.

It will thus be seen that there are provided improved eyeglass constructions of the character described whereby the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. An eyeglass frame construction comprising a single metallic resilient lens carrier means, a one-piece plastic brow bar assembled to extend over said carrier means, a mid-portion of said brow bar enveloping a section of said carrier means for embeddingly anchoring the same thereto, and releasable fastening means terminating said brow bar and carrier means for selectively securing lenses positioned therebetween, said brow bar having a continuous recessed edge groove with a portion of the latter serving as said carrier means enveloping section, edge rims of said enveloping section groove extending in a bent clamping position to provide the embedded anchoring for said carrier means section.

2. An eyeglass frame construction comprising a single relatively thin resilient metallic lens carrier of channel cross-section bent into a pair of lens supporting loop portions spaced apart by a mid-bight portion, a one-piece plastic brow bar assembled to extend over said lens carrier, said brow bar being formed with a continuous recessed edge groove, said mid-bight portion of the lens carrier being positioned in a mid-portion of said brow bar groove, edge rims of said groove extending in a bent clamping position enveloping said lens carrier mid-bight portion for embeddingly anchoring the latter therein, and releasable fastening means terminating said brow bar and lens carrier for selectively securing lenses positioned therebetween, said fastening means including screw members passing through opposite ends of the lens carrier for securing said opposite ends in place to rigidly retain the lenses and for releasing said opposite ends to permit flexing to insert said lenses in said therebetween position.

3. An eyeglass frame construction comprising a single relatively thin resilient metallic lens carrier bent into a pair of lens supporting loop portions spaced apart by a mid-bright portion, a one-piece plastic brow bar assembled to extend over said lens carrier, said brow bar being formed with a continuous recessed edge groove, said mid-bight portion of the lens carrier being positioned in a mid-portion of said brow bar groove, edge rims of said groove extending in a bent clamping position enveloping said lens carrier mid-bight portion for embeddingly anchoring the latter therein, and means for releasably securing opposite ends of the lens carrier to the brow bar to provide for easy insertion and removal of lenses between the brow bar and lens carrier.

CHARLES CASTELLI.

References Cited in the file of this patent

UNITED STATES PATENTS

| Number | Name | Date |
|---|---|---|
| 1,235,842 | Reagan | Aug. 7, 1917 |
| 2,329,100 | Chappell | Sept. 7, 1943 |
| 2,380,638 | D'Urbano | July 31, 1945 |
| 2,512,011 | Crane | June 20, 1950 |

FOREIGN PATENTS

| Number | Country | Date |
|---|---|---|
| 404,774 | Great Britain | Jan. 25, 1934 |
| 424,567 | Great Britain | Feb. 25, 1935 |